US009911135B2

(12) United States Patent
Gupta

(10) Patent No.: US 9,911,135 B2
(45) Date of Patent: Mar. 6, 2018

(54) ONLINE ADVERTISING WITH ENHANCED PUBLISHER INVOLVEMENT

(75) Inventor: Arpit Gupta, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 1045 days.

(21) Appl. No.: 12/946,668

(22) Filed: Nov. 15, 2010

(65) Prior Publication Data

US 2012/0123859 A1 May 17, 2012

(51) Int. Cl.
*G06Q 30/00* (2012.01)
*G06Q 30/02* (2012.01)

(52) U.S. Cl.
CPC ..... *G06Q 30/0251* (2013.01); *G06Q 30/0277* (2013.01)

(58) Field of Classification Search
USPC .......................................................... 705/14
See application file for complete search history.

(56) References Cited

U.S. PATENT DOCUMENTS

| 2006/0265493 A1* | 11/2006 | Brindley et al. ............... 709/224 |
| 2008/0201188 A1* | 8/2008 | Heyman et al. ................... 705/7 |
| 2009/0012905 A1* | 1/2009 | Mawani et al. ................. 705/80 |
| 2010/0293046 A1* | 11/2010 | Cooke et al. .............. 705/14.42 |
| 2010/0293063 A1* | 11/2010 | Atherton et al. .......... 705/14.73 |
| 2011/0213655 A1* | 9/2011 | Henkin et al. ............. 705/14.49 |
| 2011/0320273 A1* | 12/2011 | Miranda-Steiner ........ 705/14.49 |
| 2012/0123856 A1* | 5/2012 | Paunikar et al. .......... 705/14.48 |
| 2013/0097311 A1* | 4/2013 | Mazumdar et al. .......... 709/224 |
| 2013/0138487 A1* | 5/2013 | Crasmaru et al. ........... 705/14.4 |

* cited by examiner

*Primary Examiner* — Alvin L Brown
(74) *Attorney, Agent, or Firm* — Mauriel Kapouytian Woods LLP; Lana Akopyan; James Woods

(57) ABSTRACT

Techniques are provided for use in connection with online advertising exchanges. Methods are provided in which information is obtained, including, for each of multiple publisher sites, a set of publisher site tags, and for each of multiple advertisements, a set of advertisement tags. Methods are provided that include, in selection of an advertisement to be served in connection with a serving opportunity, utilizing, as a factor in the selection, matching of publisher site tags, associated with a publisher site associated with the serving opportunity, with advertisement tags of the advertisement.

20 Claims, 5 Drawing Sheets

300

302 using one or more computers, obtain a first set of information including, for each of multiple publisher sites, a set of publisher site tags, and for each of multiple advertisements, a set of advertisement tags, in which the tags are term-based

304 using one or more computers, in selection of an advertisement, of the multiple advertisements, to be served in connection with a serving opportunity, in which the serving opportunity relates to an advertisement serving opportunity on a publisher site of the multiple publisher sites, utilize, as a factor in the selection, matching based at least in part on one or more publisher site tags of the publisher site and one or more advertisement tags of the advertisement, and in which publisher site tags are initially submitted by publishers, and in which advertisement tags are initially submitted by advertisers, and in which publisher site tags and advertisement tags are added to, deleted, or modified by an entity that facilitates operation of an advertisement exchange, based at least in part on historical online advertising information, and in which the matching includes selecting a particular candidate advertisement based at least in part on similarity or number of identical tags between advertisement tags associated with the particular candidate advertisement and publisher site tags associated with the publisher site

306 using one or more computers, facilitate serving of the selected advertisement in connection with the serving opportunity

FIG. 3

ONLINE ADVERTISING WITH ENHANCED PUBLISHER INVOLVEMENT

BACKGROUND

In advertisement exchanges, such as auction-based online advertising exchanges, parties such as publishers play a very important role. Yet existing techniques do not sufficiently provide for or optimize involvement of publishers and other involved parties.

There is a need for techniques for use in auction-based online advertising exchanges, such as techniques for optimizing such exchanges and associated operations.

SUMMARY

Some embodiments of the invention provide techniques for use in connection with online advertising exchanges. Methods are provided in which information is obtained including, for each of multiple publisher sites, a set of publisher site tags, and for each of multiple advertisements, a set of advertisement tags. Methods are provided that include, in selection of an advertisement to be served in connection with a serving opportunity, utilizing, as a factor in the selection, matching of publisher site tags, associated with a publisher site associated with the serving opportunity, with advertisement tags of the advertisement.

BRIEF DESCRIPTION OF THE DRAWINGS

FIG. 3 is a flow diagram illustrating a method according to one embodiment of the invention;

While the invention is described with reference to the above drawings, the drawings are intended to be illustrative, and the invention contemplates other embodiments within the spirit of the invention.

DETAILED DESCRIPTION

Figure 1:
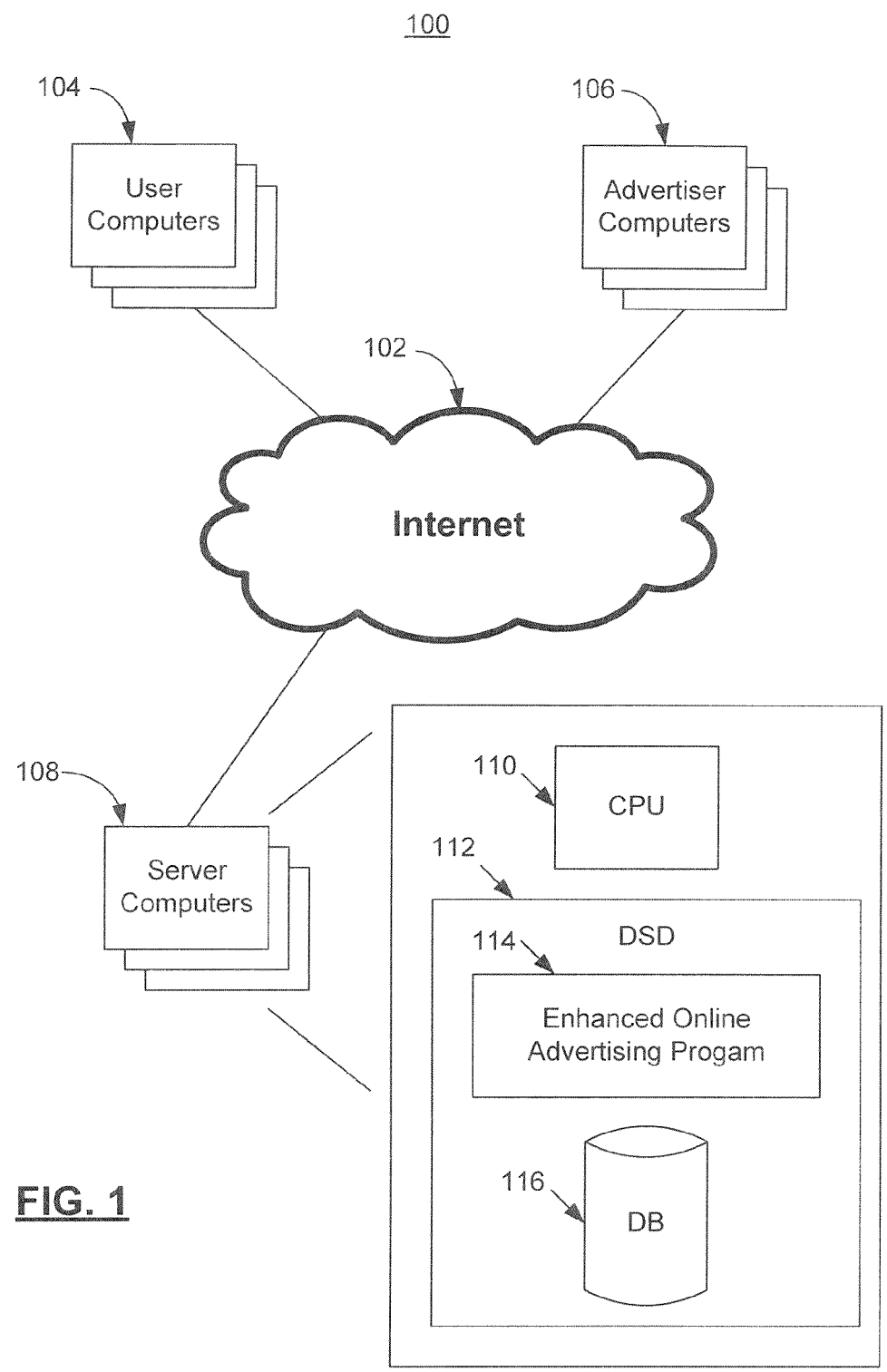
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and an Enhanced Online Advertising Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
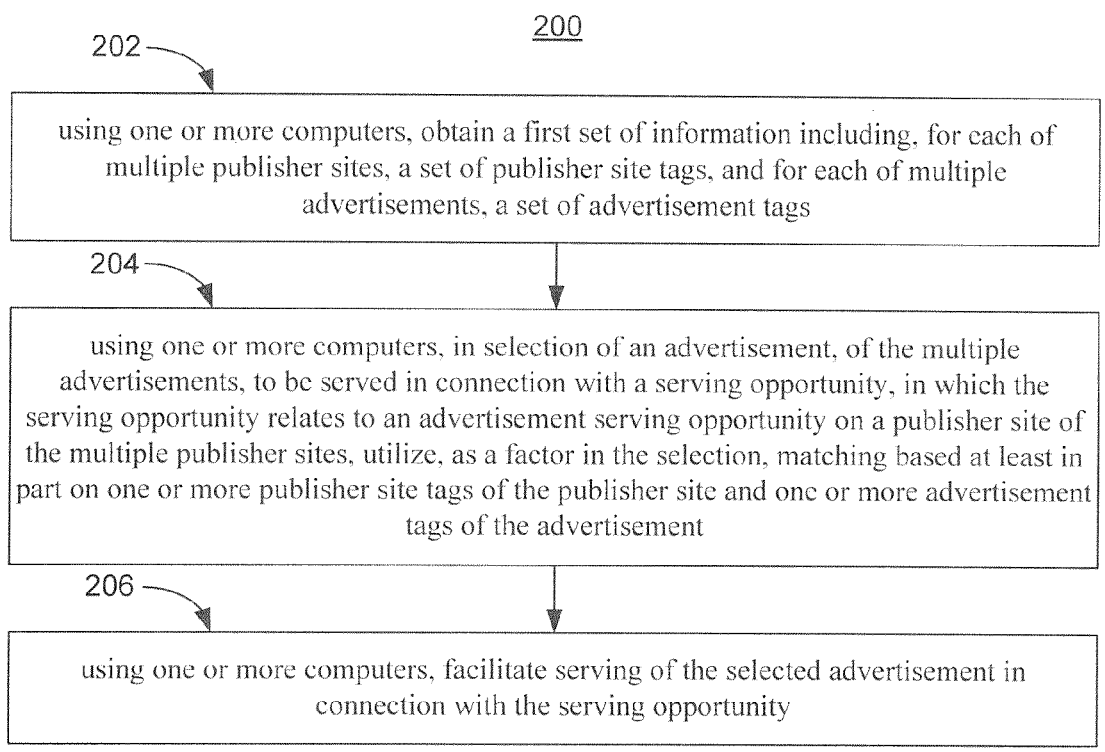
FIG. 2 is a flow diagram illustrating a method according to one embodiment of the invention.

FIG. 2 is a flow diagram illustrating a method 200 according to one embodiment of the invention. At step 202, using one or more computers, a first set of information is obtained, including, for each of multiple publisher sites, a set of publisher site tags, and for each of multiple advertisements, a set of advertisement tags.

At step 204, using one or more computers, in selection of an advertisement, of the multiple advertisements, to be served in connection with a serving opportunity, in which the serving opportunity relates to an advertisement serving opportunity on a publisher site of the multiple publisher sites, the method 200 includes utilizing, as a factor in the selection, matching based at least in part on one or more publisher site tags of the publisher site and one or more advertisement tags of the advertisement.

At step 206, using one or more computers, serving is facilitated of the selected advertisement in connection with the serving opportunity.

FIG. 3 is a flow diagram illustrating a method 300 according to one embodiment of the invention. At step 302, using one or more computers, a first set of information is obtained, including, for each of multiple publisher sites, a set of publisher site tags, and for each of multiple advertisements, a set of advertisement tags, in which the tags are term-based.

At step 304, using one or more computers, in selection of an advertisement, of the multiple advertisements, to be served in connection with a serving opportunity, in which the serving opportunity relates to an advertisement serving opportunity on a publisher site of the multiple publisher sites, the method 300 includes utilization, as a factor in the selection, matching based at least in part on one or more publisher site tags of the publisher site and one or more advertisement tags of the advertisement. Publisher site tags are initially submitted by publishers, and advertisement tags are initially submitted by advertisers. Publisher site tags and advertisement tags are added to, deleted, or modified by an entity that facilitates operation of an advertisement exchange, based at least in part on historical online advertising information. The matching includes selecting a particular candidate advertisement based at least in part on similarity of tags or number of identical tags between advertisement tags associated with the particular candidate advertisement and publisher site tags associated with the publisher site.

It is to be noted that tags for an advertisement or publisher site may include tags associated with an advertisement group or type including the advertisement, publisher site group or type of publisher site, etc. Furthermore, the term "publisher" and "advertiser" can broadly include proxies and agents thereof.

Figure 4:
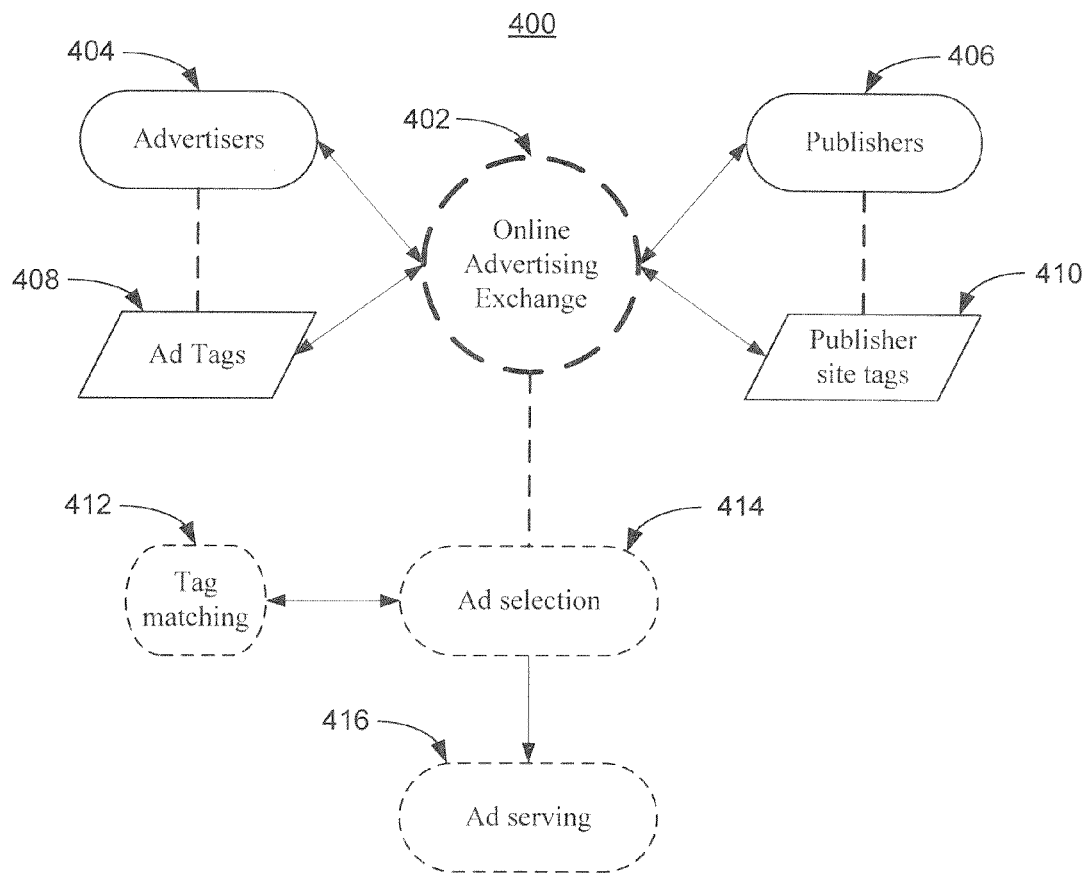
FIG. 4 is a block diagram illustrating one embodiment of the invention.

FIG. 4 is a block diagram 400 illustrating one embodiment of the invention. An online advertising exchange 402 is conceptually shown. Various entities and networks may be coupled to the exchange, including advertisers 404 and publishers 406.

Each publisher may be associated with one or more publisher sites, and each site may be associated with one or more publisher site tags 410. Furthermore, each advertiser may be associated with one or more advertisements, and each advertisement (or group of advertisements, etc.) may be associated with one or more advertisement tags 408.

As part of advertisement selection 414, tag matching 412 may be utilized in connection with selecting an advertisement for serving in connection with a serving opportunity relating to a publisher site. Of course, many other criteria and targeting parameters may also be utilized. Following selection of an advertisement, the advertisement is served 416 in connection with the serving opportunity.

Figure 5:
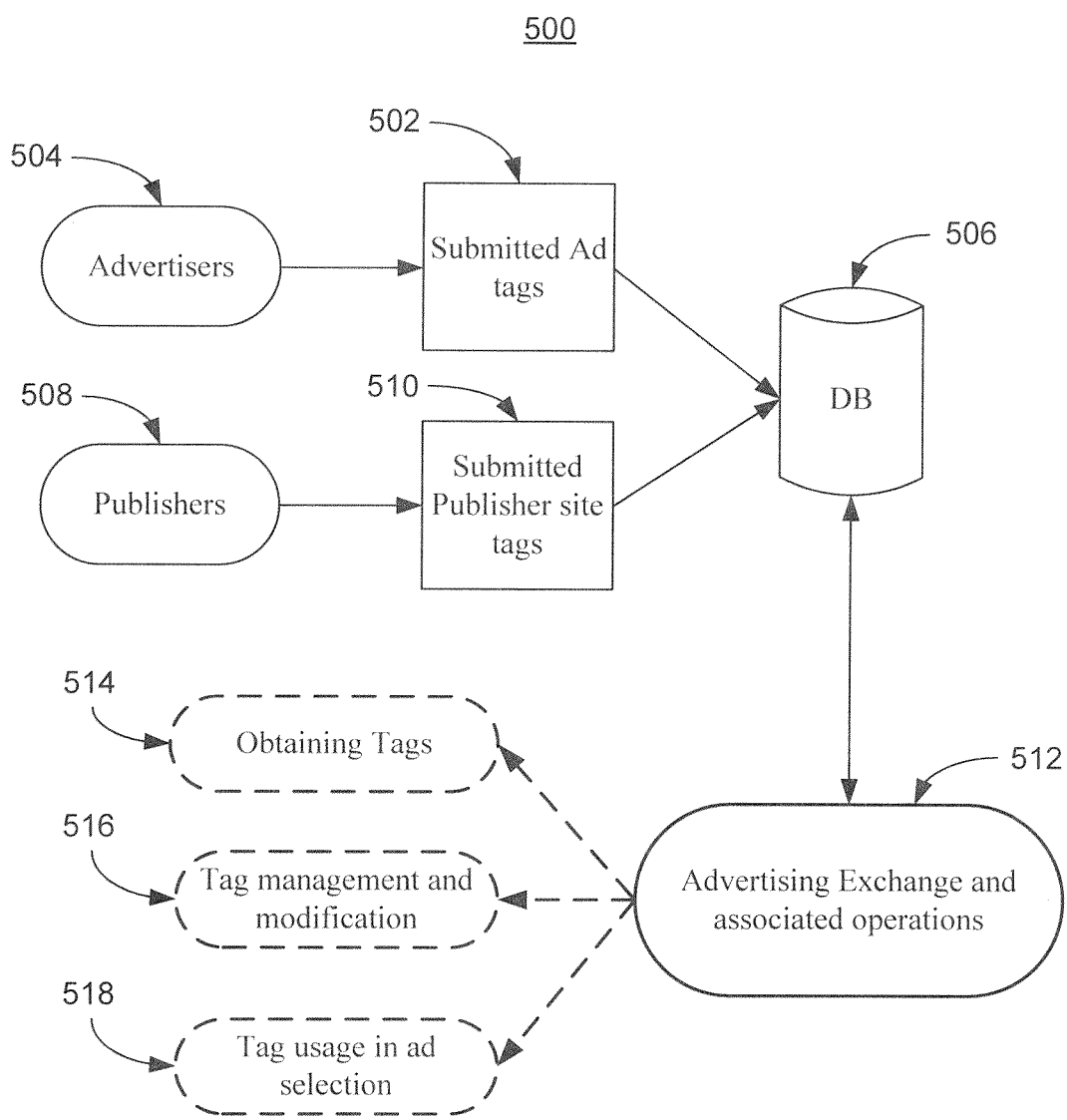
FIG. 5 is a block diagram illustrating one embodiment of the invention.

FIG. 5 is a block diagram 500 illustrating one embodiment of the invention. As depicted, advertisement tags 502 and publisher site tags 510 are obtained from advertisers 504 and publishers 508, and stored in a database 506.

Data from the database 506, including tag-related data, is utilized in the advertising exchange and related operations 512, including in advertisement selection for serving in connection with serving opportunities.

As depicted, among other things, such operations include obtaining tags 514, such as from advertisers and publishers. The operations further include tag management and modification 516, which can include adding, deleting or changing tags, such as by an exchange or auction-based marketplace facilitator entity and based on historical online advertising information. For example, tags may be modified to prevent fraud or increase the accuracy of the tagging, given topics, content or characteristics or advertisements or publisher sites, for example. The operations further include tag usage in advertisement selection 518, such as in connection with serving opportunities, and based at least in part on matching of candidate advertisement tags with publisher site tags, where the publisher site is associated with a serving opportunity.

Some embodiments of the invention apply to advertising exchanges, including auction-based exchanges and marketplaces. Some embodiments include a recognition that the role of publishers in advertising exchanges has not been sufficient, ideal or optimized, and auction-based marketplaces, for example, have been focused generally on advertisers and not publishers. Enhancing the role of publisher can lead to better matching of advertisements to publisher sites, generally leading to better online advertising optimization. This can include, for example, better advertisement performance, better publisher satisfaction with the nature of the advertising traffic on the publisher's site, better relevancy, etc.

Some embodiments of the invention allow for a more active role for publishers as well as advertisers. Many existing auctions operate such that advertiser bid is a key factor in advertisement selection, but factors may not be included to, for example, specifically assure that advertisements are optimally matched to publisher sites. For example, in some embodiments, a real-time relevance-related match can rank publishers in descending relevance order for a particular advertisement call. In some embodiments, a publisher will only be included in the ranking for the advertisement call if the publisher has unutilized inventory. In some embodiments, tagging is required of the publisher sites and advertisements (or groups of advertisements). Furthermore, in some embodiments, a mechanism is provided to associate weights to tags based on past performance history, such as performance history of publisher sites and advertisements.

As an example, in some embodiments, a Web portal may have a finance property, which may have a finance tag associated with it, which may be appropriate since the vertical it is targeting may be anything related with finance, stock markets, financial regulations, P&L reports, earning reports, financial instruments, statistics such as GDP, PPP and other ratings of economic performance, etc., with the underlying theme being finance. Often, however, there may also be news and articles on the finance property that are also associated with other topics such as celebrities, sports, etc. For example, an article topic may be that Manchester United ropes in Pele as their coach for a multi-million dollar contract, or that United Breweries has become executive sponsor for Royal Challengers in an undisclosed deal, or that Oracle has acquired Primavera for $100 million dollars cash, or that Tom Hanks has signed for a two billion dollar contract with Reliance Big TV. As can be seen, these news items could as well suit sports, or celebrities, corporate, M&A, and other topics or domains as well. As such, some embodiments provide a mechanism to provide a weight to the tags associated with a publisher site, to help better define or select for advertisements to be served on them.

Similar topics apply to advertisements as well. For example a primary tag can relate to a product or service that is the subject of the advertisement. However, additional tags can be included and marked with lower weights to help represent or select for other types of consumers or publishers that advertiser is interested in targeting. In some embodiments, the weights will be altered based on performance over a period of time. Initially, the advertisers and publishers can provide the tags and weights, but once in the system the values can be altered based, for example, on the performance parameters. Some embodiments further include automated addition and removal of tags based on, for example, various heuristics, which can help tune the exchange for better performance.

Some embodiments of the invention improve performance parameters such as click rates and user actions. Furthermore, some embodiments help tune relevance from the audience point of view.

In some embodiments, publishers tag their sites and this information is extracted by exchange. Additional weighted tags may also be generated based on performance or usage. In an advertisement call, the publisher tag information may also be provided. Only advertisements that have one or more similar or identical tags matching this may be candidates for selection or may be selected. As such, some embodiments provide improvements over existing systems in ensuring a good or optimized match between a publisher site and a served advertisement.

Furthermore, some embodiments lessen or eliminate the chances of good advertisements showing up on rogue sites via exchanges. For example, in some embodiments, tags are updated by the exchange, or an associated entity. As such, based on usage history, rogue publishers can be identified and tossed down from the exchange.

In some embodiments, all participating publishers and advertisers are mandated to provide tags with their submissions. Furthermore, based on the past usage the exchange can also add more tags to the advertisements and publisher sites. If the system finds that tags don't represent the advertisement and/or site correctly, then those tags may be removed and appropriate tags may be added.

In some embodiments, an interface or selection system may be provided to users, such as advertisers and publishers, to input or select tags. Furthermore, in some embodiments, if the user opts not to or fails to do so, the system may generate or select tags for the user.

In some embodiments, when an advertisement call comes, tags are provided, along with, and in addition to, various targeting attributes.

Some embodiments help in providing more optimally focused advertisements, better targeted to more relevant publishers. This can improve click through rate as a result of more relevant or better matched advertisements and advertisement content served on publisher sites. Furthermore, compliance or preference type issues may be addressed, such as, for example, an advertiser not wanted an advertisement show up on an undesirable or ethically objectionable publisher site.

In some embodiments, for an incoming advertisement call, matching is performed between candidate advertisement tags and publisher site tags. Tag-based matching can ensure that an advertisement is not served in connection with the advertisement call unless it has one or more tags in common with the associated publisher site. Tag-based matching can also help ensure that publisher site and advertisement content match well.

In some embodiments, tags may be updated or modified offline by the exchange or a related entity. For example, it may be determined from usage statistics that particular advertisements or groups of advertisements, as well as particular publisher sites or groups of sites, would be more appropriately or more accurately tagged differently. Information such as user reviews, complaints and heuristics may be obtained. Based on various information and heuristics, new tags may be determined and added, an editorial process may be utilized for tag modification or removal, etc.

While the invention is described with reference to the above drawings, the drawings are intended to be illustrative, and the invention contemplates other embodiments within the spirit of the invention.

The invention claimed is:

1. A method comprising:
receiving over the Internet a set of publisher site tags for each of multiple publisher sites, submitted by a publisher, utilizing an interface configured for publisher site tag input and selection, and storing in a database interconnected with a tag management system configured for tag management and automated online and offline modification the publisher site tags utilizing a tag management system;
receiving over the Internet a set of advertiser site tags for each of multiple advertisements, submitted by an advertiser, utilizing an interface configured for advertiser site tag input and selection, and storing in the database the advertiser site tags utilizing the tag management system, wherein the advertiser site tags include compliance requirements set by the advertiser including publisher site preferences;
obtaining a first set of information, utilizing the tag management system, comprising, for each of multiple publisher sites, querying the database in real-time to relevance rank publishers based on the submitted set of publisher site tags and for each of multiple advertisements, querying the database for the submitted set of advertisement tags for a particular advertisement call;
selecting an advertisement, of the multiple advertisements, to be served in connection with a serving opportunity, wherein the serving opportunity relates to an advertisement serving opportunity on a publisher site of the multiple publisher sites, utilizing, as a factor in the selection, matching based at least in part on one or more publisher site tags of the publisher site and one or more advertisement tags of the advertisement, utilizing the tag management system; and
serving the selected advertisement in connection with the serving opportunity, wherein the tag management system is comprised of at least one database, and wherein the tag management system is configured to manage, modify and utilize tag-related data.

2. The method of claim 1, comprising serving of the selected advertisement in connection with the serving opportunity.

3. The method of claim 1, wherein publisher site tags are required to be initially submitted by publishers, and wherein advertisement tags are required to be initially submitted by advertisers.

4. The method of claim 1, wherein advertisement tags may be obtained in association with groups of advertisements and may be applicable to advertisements in the group.

5. The method of claim 1, comprising obtaining the first set of information, wherein tags are term-based.

6. The method of claim 1, comprising obtaining the first set of information, wherein tags are term-based, and where each terms comprises one or more words.

7. The method of claim 1, wherein publishers are provided with a graphical user interface to facilitate selection of publisher site tags.

8. The method of claim 1, wherein publisher site tags and advertisement tags are added to, deleted, or modified by an entity that facilitates an advertisement exchange, based on online advertising information.

9. The method of claim 1, wherein publisher site tags and advertisement tags are added to, deleted, or modified by an entity that facilitates operation of an advertisement exchange, based on online advertising information, and wherein tags are deleted if determined to be inappropriate, and wherein tags are added if determined to be appropriate but not previously included.

10. The method of claim 1, wherein the matching comprises selecting a particular candidate advertisement based at least in part on similarity of tags or number of identical tags between advertisement tags associated with the particular candidate advertisement and publisher site tags associated with the publisher site.

11. The method of claim 1, wherein only advertisements with at least one advertisement tag in common with at least one publisher tag associated with the publisher site are candidates for selection in connection with the serving opportunity.

12. A system comprising:
one or more server computers coupled to a network; and
one or more databases coupled to the one or more server computers;
wherein the one or more server computers are for:
receiving over the Internet a set of publisher site tags for each of multiple publisher sites, submitted by a publisher, utilizing an interface configured for publisher site tag input and selection, and storing in a database interconnected with a tag management system configured for tag management and automated online and offline modification the publisher site tags utilizing a tag management system;

receiving over the Internet a set of advertiser site tags for each of multiple advertisements, submitted by an advertiser, utilizing an interface configured for advertiser site tag input and selection, and storing in the database the advertiser site tags utilizing the tag management system, wherein the advertiser site tags include compliance requirements set by the advertiser including publisher site preferences;

obtaining a first set of information, utilizing the tag management system, comprising, for each of multiple publisher sites, querying the database in real-time to relevance rank publishers based on the submitted set of publisher site tags, and for each of multiple advertisements, querying the database for the submitted set of advertisement tags for a particular advertisement call;

selecting an advertisement, of the multiple advertisements, to be served in connection with a serving opportunity, wherein the serving opportunity relates to an advertisement serving opportunity on a publisher site of the multiple publisher sites, utilizing, as a factor in the selection, matching based at least in part on one or more publisher site tags of the publisher site and one or more advertisement tags of the advertisement, utilizing the tag management system; and serving the selected advertisement in connection with the serving opportunity, wherein the tag management system is comprised of at least one database, and wherein the tag management system is configured to manage, modify and utilize tag-related data.

13. The system of claim 12, wherein at least one of the one or more server computers is coupled to the Internet.

14. The system of claim 12, comprising serving of the selected advertisement in connection with the serving opportunity.

15. The system of claim 12, wherein publisher site tags are required to be initially submitted by publishers, and wherein advertisement tags are required to be initially submitted by advertisers.

16. A non-transitory computer readable medium or media containing instructions for executing a method comprising:

receiving over the Internet a set of publisher site tags for each of multiple publisher sites, submitted by a publisher, utilizing an interface configured for publisher site tag input and selection, and storing in a database interconnected with a tag management system configured for tag management and automated online and offline modification the publisher site tags utilizing a tag management system;

receiving over the Internet a set of advertiser site tags for each of multiple advertisements, submitted by an advertiser, utilizing an interface configured for advertiser site tag input and selection, and storing in the database the advertiser site tags utilizing the tag management system, wherein the advertiser site tags include compliance requirements set by the advertiser including publisher site preferences;

obtaining a first set of information, utilizing the tag management system, comprising, for each of multiple publisher sites, querying the database in real-time to relevance rank publishers based on the submitted set of publisher site tags, and for each of multiple advertisements, querying the database for the submitted set of advertisement tags for a particular advertisement call, wherein tags are term-based;

selecting an advertisement, of the multiple advertisements, to be served in connection with a serving opportunity, wherein the serving opportunity relates to an advertisement serving opportunity on a publisher site of the multiple publisher sites, utilizing, as a factor in the selection, matching based at least in part on one or more publisher site tags of the publisher site and one or more advertisement tags of the advertisement, utilizing the tag management system;

wherein the tag management system is comprised of at least one database, and wherein the tag management system is configured to manage, modify and utilize tag-related data;

wherein publisher site tags and advertisement tags are added to, deleted, or modified by an entity that facilitates operation of an advertisement exchange, based at least in part on historical online advertising information; and wherein the matching comprises selecting a particular candidate advertisement based at least in part on similarity of tags or number of identical tags between advertisement tags associated with the particular candidate advertisement and publisher site tags associated with the publisher site; and serving the selected advertisement in connection with the serving opportunity.

17. The method of claim 1, wherein matching further comprises ranking publishers with unutilized inventory in descending relevance order based on the advertisement.

18. The method of claim 1, wherein each of the publisher site tags include primary tags related to an underlying theme of the publisher site, and additional tags, marked with a lower weight than the primary tags.

19. The method of claim 1, wherein each of the advertisement tags include primary tags related to a product or service that is a subject of the advertisement, and additional tags, marked with a lower weight than the primary tags.

20. The method of claim 1, wherein each of the publisher site tags and the advertisement tags have an initial weight assigned by the publisher and the advertiser, respectively.

* * * * *